US012115634B2

(12) United States Patent
Akiba

(10) Patent No.: US 12,115,634 B2

(45) Date of Patent: Oct. 15, 2024

(54) DRIVING TOOL

(71) Applicant: MAKITA CORPORATION, Anjo (JP)

(72) Inventor: Yoshitaka Akiba, Anjo (JP)

(73) Assignee: MAKITA CORPORATION, Anjo (JP)

( * ) Notice: Subject to any disclaimer, the term of this patent is extended or adjusted under 35 U.S.C. 154(b) by 147 days.

(21) Appl. No.: 17/801,138

(22) PCT Filed: Mar. 2, 2021

(86) PCT No.: PCT/JP2021/007840

§ 371 (c)(1),
(2) Date: Aug. 19, 2022

(87) PCT Pub. No.: WO2021/192838

PCT Pub. Date: Sep. 30, 2021

(65) Prior Publication Data

US 2023/0071613 A1 Mar. 9, 2023

(30) Foreign Application Priority Data

Mar. 24, 2020 (JP) ................................. 2020-052259

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/06; B25C 1/04; B25C 1/041; B25C 1/042; B25C 1/043; B25C 1/044; B25C 1/008; B25C 1/00
See application file for complete search history.

(56) References Cited

U.S. PATENT DOCUMENTS

| | | | | |
|---|---|---|---|---|
| 10,843,318 | B2 | 11/2020 | Kobori et al. | |
| 11,229,996 | B2 | 1/2022 | Nagao | |
| 2010/0116865 | A1* | 5/2010 | Ogawa | B25C 1/047 173/199 |
| 2018/0036870 | A1* | 2/2018 | Komazaki | B25C 1/06 |
| 2018/0133877 | A1* | 5/2018 | Ueda | B25F 5/006 |
| 2018/0290279 | A1* | 10/2018 | Kobori | B25C 1/047 |

(Continued)

FOREIGN PATENT DOCUMENTS

| | | |
|---|---|---|
| JP | H07-156075 A | 6/1995 |
| JP | 2006-218587 A | 8/2006 |

(Continued)

OTHER PUBLICATIONS

May 11, 2021 International Search Report issued in Patent Application No. PCT/JP2021/007840.

*Primary Examiner* — Veronica Martin

(74) *Attorney, Agent, or Firm* — Oliff PLC

(57) ABSTRACT

A gas-spring type driving tool with a charge valve, a relief valve, and an opening valve provided in an accumulation chamber. Compressed gas can be quickly charged into the accumulation chamber by connecting the charge valve to an external device. The relief valve maintains the accumulation chamber at a preset pressure. The opening valve is capable of opening the accumulation chamber quickly to the atmosphere. This allows for a quick removal of a jammed nail from a driving nose.

10 Claims, 11 Drawing Sheets

(56) References Cited

U.S. PATENT DOCUMENTS

| | | | | |
|---|---|---|---|---|
| 2020/0406439 | A1* | 12/2020 | Fujimoto | B25C 1/06 |
| 2021/0031348 | A1 | 2/2021 | Kobori et al. | |

FOREIGN PATENT DOCUMENTS

| | | | |
|---|---|---|---|
| JP | 2014-233770 | A | 12/2014 |
| JP | 6481751 | B2 | 3/2019 |
| JP | 6519651 | B2 | 5/2019 |
| JP | 2019-209395 | A | 12/2019 |
| WO | 2017/187892 | A1 | 11/2017 |

* cited by examiner

DRIVING TOOL

CROSS-REFERENCE TO RELATED APPLICATIONS

The present application is a U.S. National Phase entry of, and claims priority to, PCT Application PCT/JP2021/007840, filed Mar. 2, 2021, which claims priority to Japanese Patent Application No. 2020-052259, filed Mar. 24, 2020, both of which are incorporated herein by reference in their entireties for all purposes.

BACKGROUND

The present invention relates to a driving tool configured to drive fasteners, such as nails or staples, into wood or the like.

As for this type of driving tool, so-called gas-spring type driving tools have been provided. In a gas-spring type driving tool, an impact piston is lowered due to an expansion force of a compressed gas charged in an accumulation chamber. The lowered impact piston is configured to strike a fastener. In one embodiment of such a device, a charge valve is configured to charge compressed gas in an accumulation chamber and a relief valve (safety valve) is configured for releasing gas above a certain pressure. In another embodiment of such a device, an external air intake valve is used to introduce external air into an accumulation chamber in response to operational movement within a tool main body. An opening valve is used to allow an operator to release the compressed gas in the accumulation chamber at any timing, in addition to an external air intake valve and a relief valve.

When, for example, nail jamming occurs, nails can be easily removed by releasing the pressure of the compressed gas in the accumulation chamber with an opening valve. It is desirable that the compressed gas be rapidly charged in the accumulation chamber after the compressed gas in the accumulation chamber has been released, which was done as a countermeasure to the jamming. This allows a driving operation to restart quickly. However, with conventional external air intake valves, it takes time to charge the gas to a sufficient gas pressure since the external air is taken in in response to an operational movement within a tool main body. This needs to be improved.

BRIEF SUMMARY

According to one aspect of the present disclosure, a driving tool may include, for example, an impact piston that moves downward to strike a fastener. The impact piston is allowed to move upward to a top dead center by a driving mechanism driven by an electric motor as a power source. The upward movement of the impact piston by the driving mechanism compresses the air to provide a thrust force that serves as a power source to move the impact piston downward to drive. The compressed gas is accumulated in an accumulation chamber. The compressed gas is charged in the accumulation chamber via a charge valve. A charge valve charges and compresses gas into the accumulation chamber. A relief valve releases the compressed gas to maintain the compressed gas in the accumulation chamber at a preset pressure. An opening valve opens the accumulation chamber to atmosphere.

Therefore, it is possible to quickly and easily take a countermeasure to jamming by allowing an accumulation chamber to open to the atmosphere via an opening valve. After opening the accumulation chamber, the compressed air will be quickly charged into the accumulation chamber from outside via the charge valve, instead of the operational movement within the tool main body, as in a conventional case. This allows the driving tool to restart quickly and to continue the driving operation.

DETAILED DESCRIPTION

Figure 1:
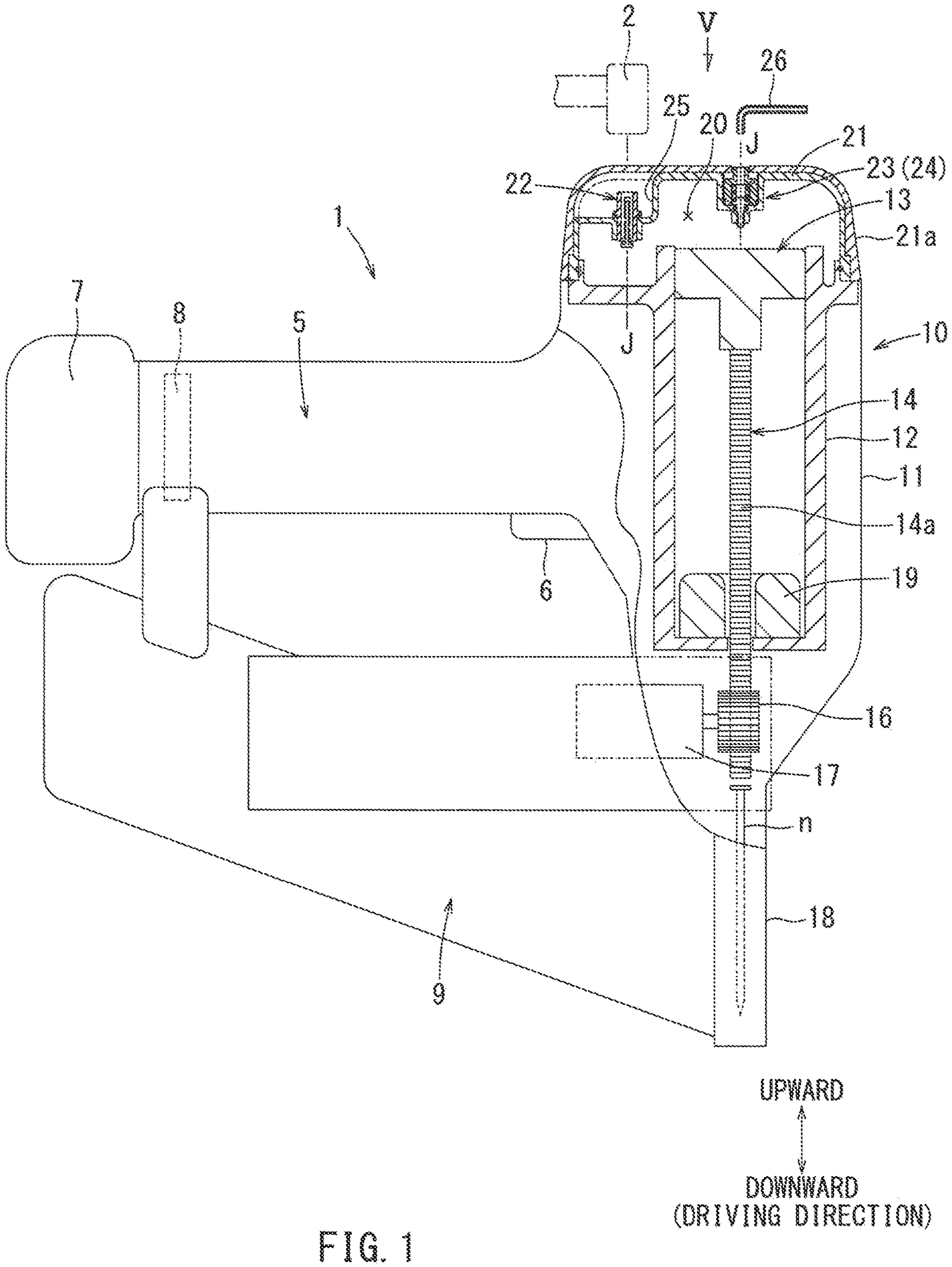
FIG. 1 is a vertical cross-sectional view of a driving tool according to a first embodiment.

According to one or more embodiment, for instance, a charge valve may include a connection port that is connected to an external device, so as to allow compressed gas supplied from the external device to be filled in an accumulation chamber. Therefore, the gas charging operation of the accumulation chamber may be performed more quickly than when done in response to an internal operational movement within a tool main body. This allows to resume the driving operation more quickly.

According to one or more embodiment, for instance, a tool housing for accommodating a cylinder and an accumulation chamber may be provided. A valve recess may be formed at the tool housing for preventing the charge valve from protruding from an outer shell of the tool housing. Therefore, it is possible to avoid interference between the charge valve and the other components, so as to avoid damage thereto.

According to one or more embodiment, for instance, the relief valve may also serve as an opening valve. Therefore, the relief valve and the opening valve are integrally formed, such that flexibility in the placement may be enhanced and downsizing can be achieved.

According to one or more embodiment, for instance, the relief valve may include a plunger configured to seal the accumulation chamber. A movable member may be displaced by being operated externally. An elastic member may be interposed between the movable member and the plunger. A biasing force of the elastic member acting on the plunger can be adjusted in accordance with the displacement of the movable member.

Therefore, the biasing force of the elastic member can be adjusted when the movable member is displaced by external operation. The gas pressure within the accumulation chamber may be adjusted by adjusting the biasing force of the elastic member. When the biasing force of the plunger is increased, the gas pressure in the accumulation chamber is increased. When the biasing force of the plunger is reduced, the gas pressure in the accumulation chamber is reduced. The plunger is fully opened such that the accumulation chamber is opened to the atmosphere when the biasing force of the elastic member is sufficiently reduced due to the displacement of the movable member.

According to one or more embodiment, for instance, the movable member is provided with a tool engagement portion configured to engage the tool to allow the movable member to move between a normal position and an operation position. Therefore, the movable member can be quickly and accurately displaced using the tool.

According to one or more embodiment, for instance, a tool housing may be provided to accommodate a cylinder and an accumulation chamber. A second valve recess is formed at the tool housing. The recess is configured to prevent the relief valve and the opening valve from projecting from the outer shell of the tool housing. Therefore, it is possible to avoid interference with other components with respect to the relief valve and the opening valve, so as to avoid damage thereto.

According to one or more embodiment, for instance, the charge valve, the relief valve, and the opening valve may be arranged independent of each other. Therefore, the operability of each valve can be ensured. The flexibility in the placement of each valve may also be enhanced.

According to one or more embodiment, for instance, at least one of the charge valve, the relief valve, and the opening valve may include a plunger which moves between a closed position and an open position along a plunger axis. The plunger is arranged such that the plunger axis intersects a moving direction of the impact piston. Therefore, flexibility in the placement of at least one of the valves may be enhanced.

According to one or more embodiment, for instance, the charge valve, relief valve, and opening valve are all disposed above the cylinder. Therefore, the structure around the cylinder may be simplified. This may achieve a slimming down of the driving tool.

According to another aspect of the present disclosure, for instance, a driving tool system may include a driving tool equipped with an accumulation chamber and an adaptor utilized when charging compressed gas into the accumulation chamber of the driving tool. The driving tool includes an impact piston that moves downward within a cylinder communicating with the accumulation chamber to strike a fastener. The impact piston moves up to a top dead center by a driving mechanism driven by an electric motor as a power source. The upward movement of the impact piston by the driving mechanism provides thrust to the compressed air, which serves as a power source to move the impact piston downward to drive. The compressed gas is accumulated in the accumulation chamber. A charge valve is provided in the accumulation chamber. The compressed gas is charged in the accumulation chamber via the charge valve. An opening/closing valve is provided in the accumulation chamber. The opening/closing valve opens the accumulation chamber to the atmosphere. The adaptor includes a first connection port removably connected to the charge valve of the driving tool. The adaptor also includes a second connection port removably connected to an external compressed gas supplying device. A relief valve is provided to the adaptor.

Accordingly, a countermeasure to jamming, etc. may be quickly and easily taken by opening the accumulation chamber to the atmosphere using the opening valve. After the accumulation chamber is opened, the compressed gas is quickly charged in the accumulation chamber from an external compressed gas supplying device via the charge valve. This enables the driving tool to quickly restart so as to allow the driving operation to continue.

The external compressed gas supplying device is connected to the charge valve via the adopter. The excessively supplied compressed air will be released to the atmosphere via the relief valve provided to the adaptor. This ensures the pressure in the accumulation chamber is maintained at a preset pressure. The adaptor is detached from the charge valve at the stage when the charging of the compressed gas into the accumulation chamber has been completed. Therefore, the driving tool may be used while the adaptor, together with the relief valve, is detached. As a result, an impact, etc. created during driving may be avoided from acting on the relief valve, such that protection of the relief valve may be achieved. As described-above, the durability of the relief valve is enhanced as the relief valve is installed in the accumulation chamber only when it is required (e.g., during the charging of the compressed gas), and as the relief valve is removed from the accumulation chamber during the driving operation. A supply nozzle of the compressor or a can of gas may be adopted as the compressed gas supplying device.

According to one or more embodiment, for example, a second connection port may be provided with an opening/closing valve configured to be connected to the compressed gas supplying device. The way the opening/closing valve and the charge valve are connected differs from each other. The compressed gas supplying device is thus not connectable to the charge valve. Therefore, the use of the adaptor enables the charging of the compressed gas into the accumulation chamber. This enables the charging under a condition where excessive supply of the compressed gas is reliably avoided by the relief valve.

Hereinafter, embodiments of the present disclosure will be disclosed with reference to FIG. 1 to FIG. 13. FIG. 1 shows a driving tool 1 according to a first embodiment. The driving tool 1 includes a tool main body 10, a handle 5 configured to be grasped by a user, and a magazine 9 in which a plurality of fasteners can be loaded.

A cylinder 12 is accommodated in a tool housing 11 of a tool main body 10. An impact piston 13 is vertically and reciprocally accommodated in the cylinder 12. A driver 14 to strike a fastener n is attached to the center of the bottom side of the impact piston 13.

An accumulation chamber 20 is provided on a top portion of the tool main body 10. The impact piston 13 moves downward due to the pressure (e.g., thrust) of compressed gas, which may serve as a power source accumulated in the accumulation chamber 20. As the impact piston 13 moves downward in the cylinder 12, the driver 14 strikes the fastener n.

The impact piston 13 and the driver 14 can be return toward the top dead center (e.g., toward the driving stand-by position shown in FIG. 1) by a driving mechanism, which may be driven by an electric motor 17 as a power source. The gas pressure within the accumulation chamber 20 increases as the impact piston 13 moves to the top dead center by the driving mechanism. This accumulated gas pressure provides a thrust force to move the impact piston 13 downward to drive. A rack gear 14*a* is formed on the driver 14 along its longitudinal direction. A pinion gear 16 meshes with the rack gear 14*a*. The pinion gear 16 is attached to an output shaft of the electric motor 17. Through the meshing of the pinion gear 16 and the rack gear 14*a*, the driver 14 and the impact piston 13 move upward by the rotational output of electric motor 17. The driver 14 and the impact piston 13 move toward the top dead center against the gas pressure of the accumulation chamber 20. A compact and high-output brushless motor may be used for the electric motor 17. The electric motor 17, as well as the meshing between the pinion gear 16 and the rack gear 14*a*, constitute an embodiment of the driving mechanism.

A damper 16 is accommodated on the side toward a bottom dead center of the tool main body 10. A downward motion end of the impact piston 13 is restricted by the damper 19. The driver 14 is positioned on and inserted through an inner circumferential side of the damper 19. A tip end of the driver 14 enters the driving channel of a driving nose 18 provided at a lower portion of the tool main body 10. A tip end of a magazine 9 is coupled to the driving nose 18. Fasteners n are fed one by one from the magazine 9 into the driving channel in conjunction with a driving operation.

A handle 5 is provided so as to project laterally from a lateral side of the tool main body 10. A trigger-type switch lever 6 is provided on a bottom side of a base of the handle 5. The electric motor 17 starts when the user pulls the switch lever 6 with his/her finger tip of his/her hand grasping the handle 5.

A battery pack 7, which may function as a power source, is attached on a tip end of the handle 5. The battery pack 7 may be repeatedly used by being recharged with a charger, which is removed and configured separately. The electric motor 17 is started by the electric power of the battery pack 7. A controller 8 is accommodated in the handle 5. The controller 8 houses a control board that includes control and power circuits, which primarily function for controlling the operation of the electric motor 17.

The accumulation chamber 20 is partitioned inside the upper housing 21, which is included in a top part of the tool housing 11. An outer surface of the upper housing 21 is covered with an elastic rubber layer 21*a* for shock adsorption. The compressed gas in the accumulation chamber 20 acts on an upper side of the impact piston 13. A charge valve 22, a relief valve 23, and an opening valve 24 are arranged within the accumulation chamber 20.

An external device 2 for filling compressed gas is configured to be connected to the charge valve 22. The compressed gas from the external device 2, when connected to the charge valve 22, is charged (refilled) into the accumulation chamber 20 via a connection port 22*f* of the charge valve 22. Excessive compressed gas is automatically released by the relief valve 23, which can assist with maintaining the gas pressure in the accumulation chamber 20 at a preset pressure. The accumulation chamber 20 is forcibly opened to the atmosphere when the opening valve 24 is operated by the user.

Figure 5:
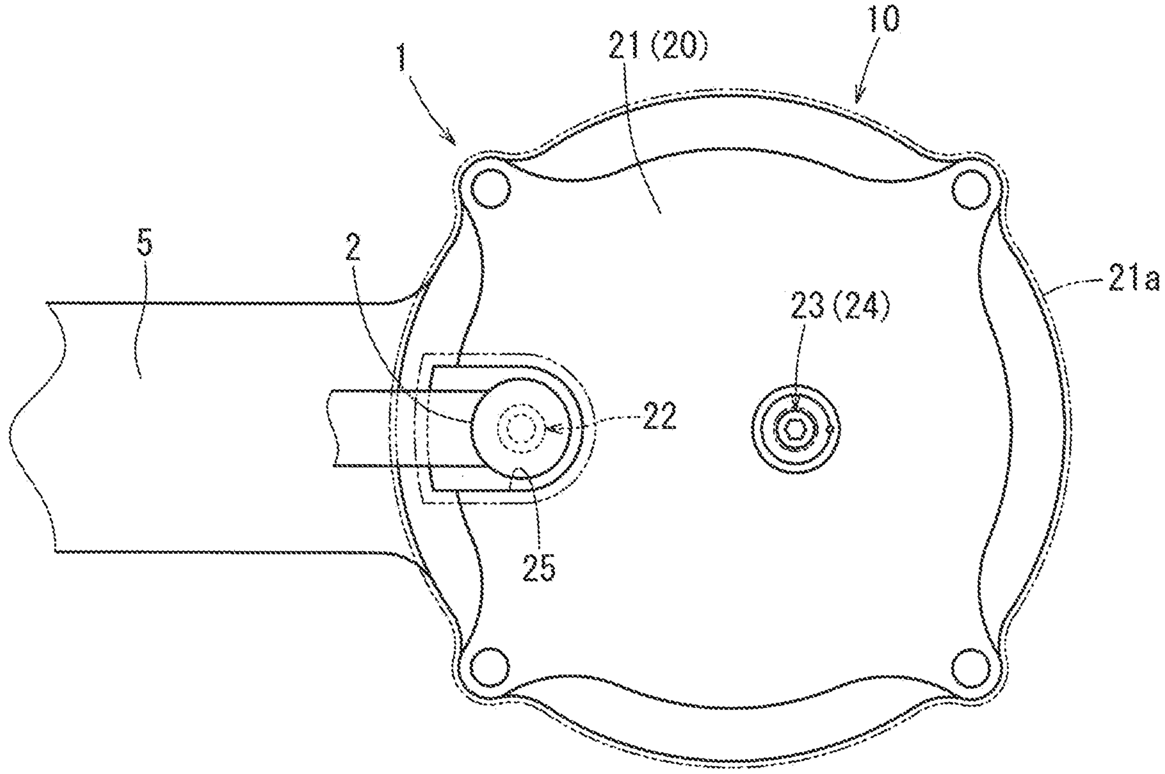
FIG. 5 is a top view of a tool main body as seen in a direction of an arrow V in FIG. 1.

A valve recess 25 is formed at the upper housing 21 to accommodate the charge valve 22. As shown in FIG. 5, the valve recess 25 is formed in a semi-elliptical shape, as viewed in a plane view. The arrangement in the valve recess 25 helps prevent the charge valve 22 from excessively projecting beyond an outer shell of the upper housing 21. This avoids the charge valve 22 interfering with other components and prevents damage to the charge valve 22.

Figure 2:
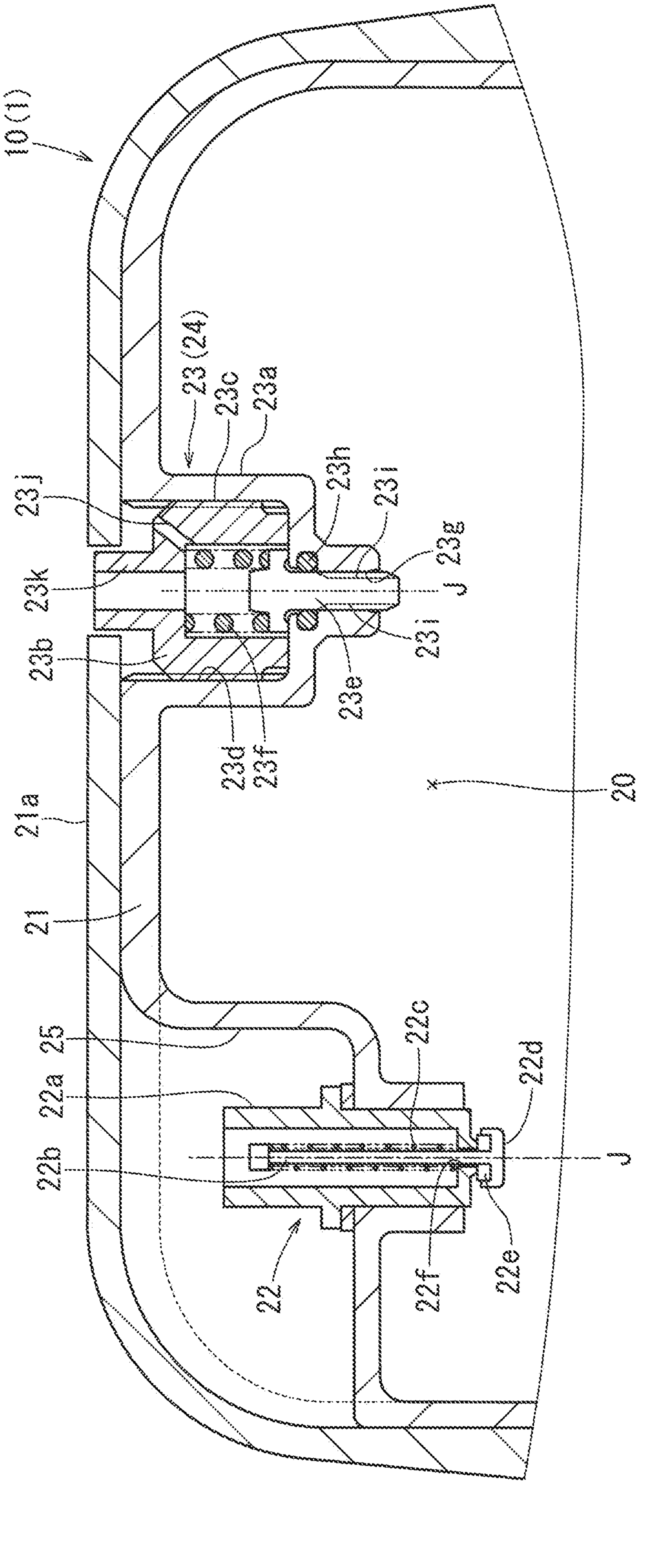
FIG. 2 is a vertical cross-sectional view of an accumulation chamber according to the first embodiment.
Figure 3:
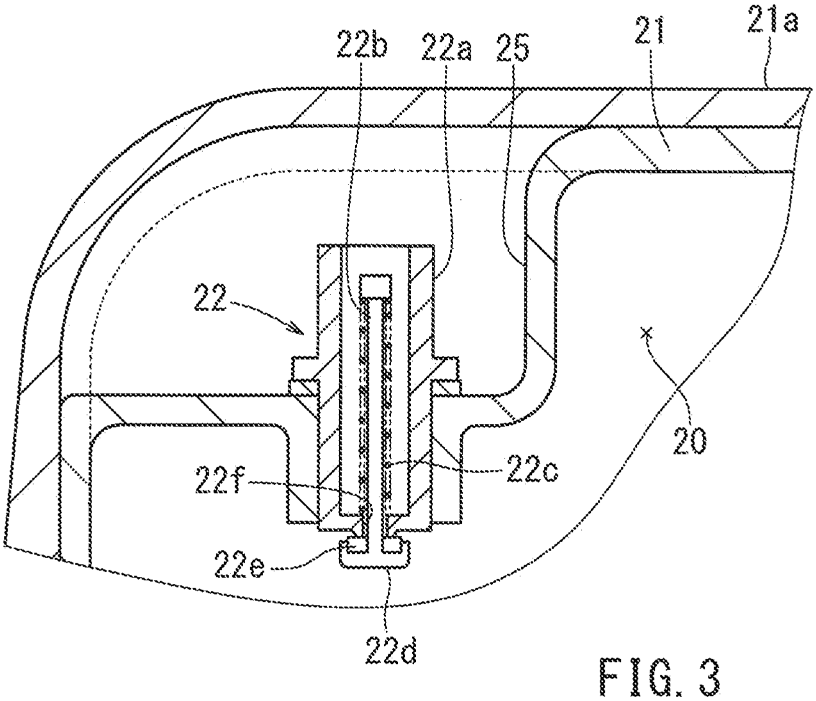
FIG. 3 is a vertical cross-sectional view of a charge valve.
Figure 4:
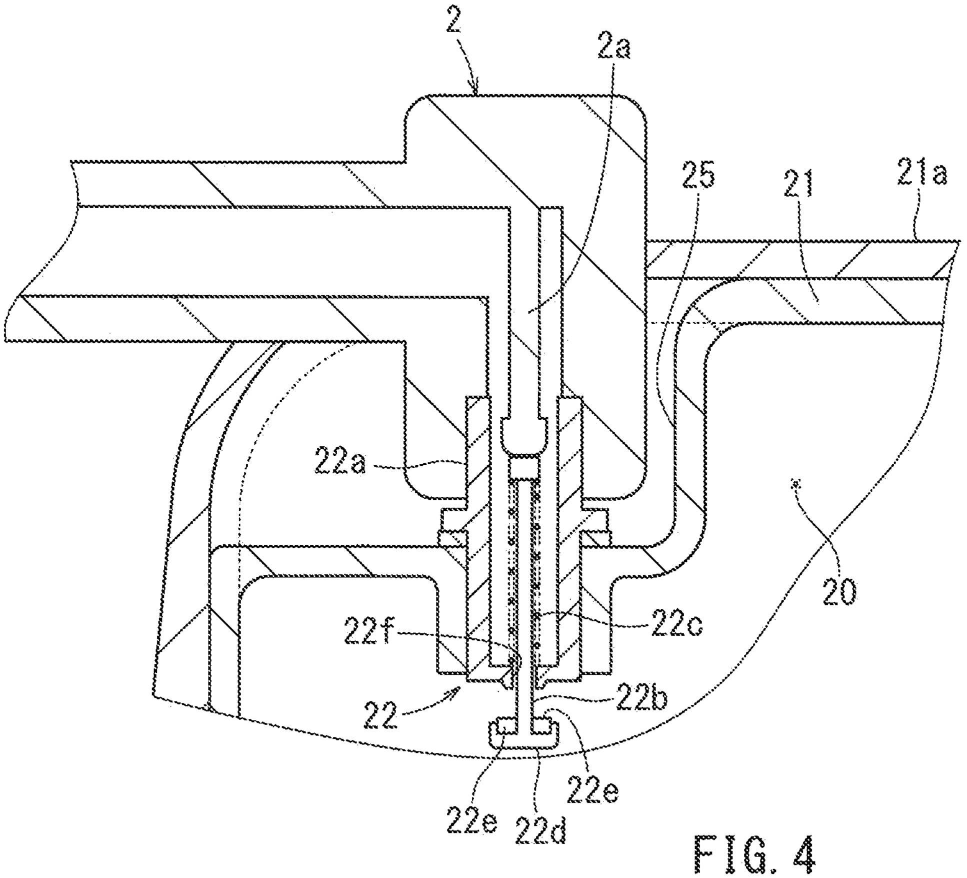
FIG. 4 is a vertical cross-sectional view of the charge valve. This figure illustrates a state where an external device for filling compressed gas is connected.

As shown in FIGS. 2 to 4, the charge valve 22 includes a cylindrical valve frame 22*a*. One plunger 22*b* is displaceably supported in an axis direction (e.g., along a plunger axis J) on an inner circumferential side of the valve frame 22*a*. A compression spring 22*c* is interposed between the valve frame 22*a* and the plunger 22*b*. A tip end of the plunger 22*b* enters into the accumulation chamber 20 from the valve frame 22*a*. The plunger 22*b* is biased in a direction (upward in the drawing), with its tip end retracted away from the accumulation chamber 20 by the compression spring 22*c*.

A flange 22*d* is integrally formed at the tip end of the plunger 22*b*. The flange 22*d* prevents the plunger 22*b* from coming off. A seal member 22*e* is attached on an upper side of the flange 22*d*. As shown in FIG. 3, the seal member 22*e* is pressed against the connection port 22*f*, which is provided at a lower side of the valve frame 22*a*, due to the biasing force of the compression spring 22*c*. The connection port 22*f* is hermetically sealed when the seal member 22*e* is pressed against the connection port 22*f* This position corresponds to an embodiment of a closed position of the plunger 22*b*. The compressed gas within the accumulation chamber 20 is prevented from leaking when the plunger 22*b* is in the closed position.

As shown in FIG. 4, when the external device 2 is attached to the charge valve 22, a pushing shaft 2*a* of the external device 2 pushes the plunger 22*b* downward, against the compression spring 22*c*. This allows the connection port 22*f* to open. This position corresponds to an embodiment of an open position of the plunger 22*b*. As the plunger 22*b* opens, the compressed gas fills the accumulation chamber 20 from the external device 2. The plunger 22*b* returns to the closed position when the external device 2 is removed. For instance, a tire inflator may be used as the external device 2. Alternatively, a gas can filled with a certain amount compressed gas may be used.

According to the first embodiment, functions of the opening valve 24 are integrated into the relief valve 23. Therefore, in the first embodiment, a single relief/opening combination valve is used as the relief valve 23 and the opening valve 24. As shown in FIG. 5, the relief valve 23 is arranged in substantially the center of the upper housing 21 and above the impact piston 13. As shown in FIG. 1, the relief valve 23 is arranged in a position where its plunger axis J substantially corresponds to an extension direction of the driver 14.

Figure 6:
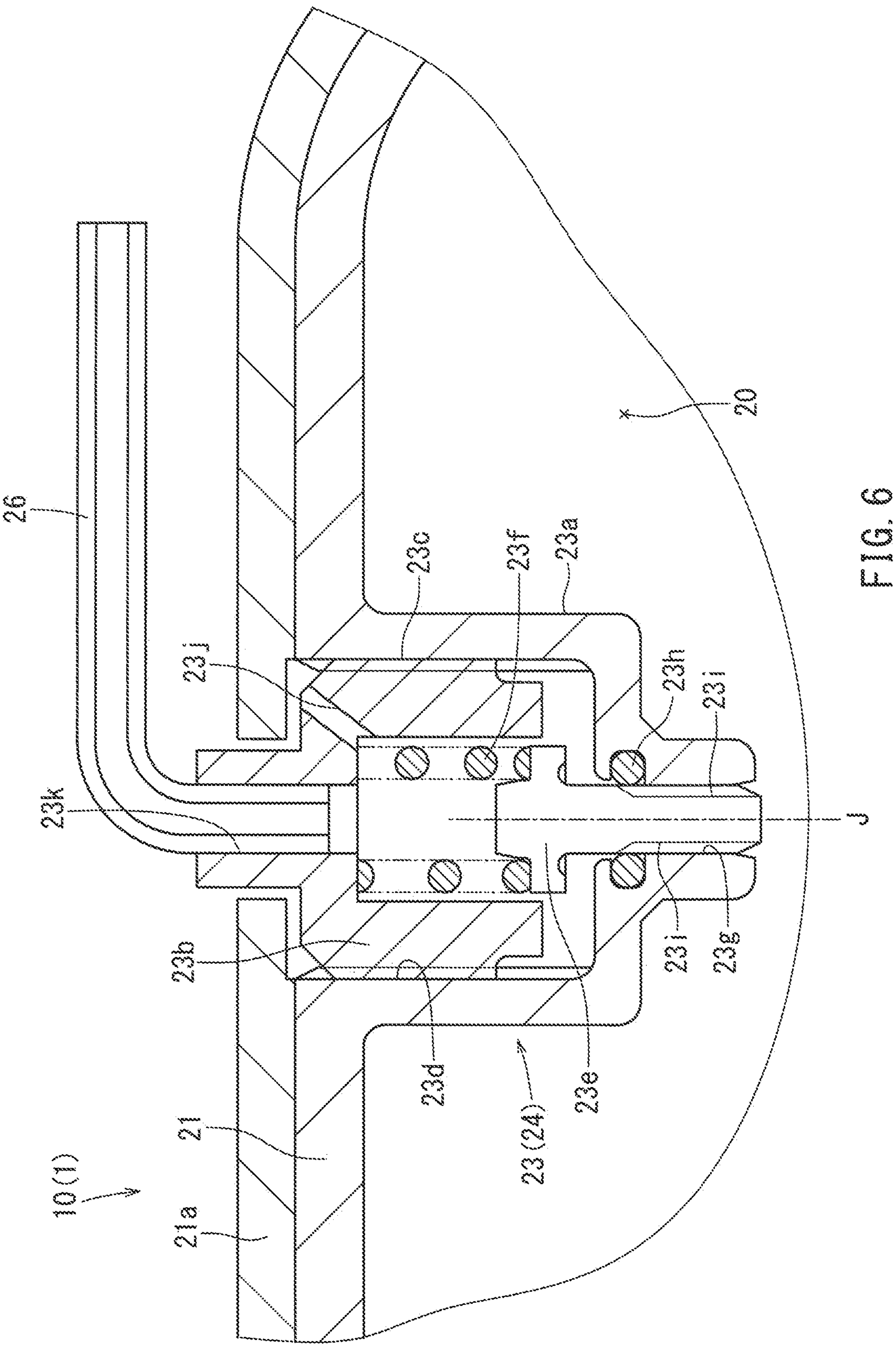
FIG. 6 is a vertical cross-sectional view of a relief valve according to a first embodiment.

As shown in FIGS. 2 and 6, the relief valve 23 includes a cylindrical valve frame 23*a*. In the present embodiment, a part of the upper housing 21 is used as the valve frame 23*a*. The valve frame 23*a* is provided so as to protrude into the accumulation chamber 20, but not to project above the outer shell of the upper housing 21. A cylindrical movable member 23*b* is provided on the inner circumferential side of the valve frame 23*a*. A male thread 23*c* is formed on an outer circumferential surface of the movable member 23*b*. The male thread 23*c* meshes with a female thread 23*d* formed on an inner circumferential surface of the valve frame 23*a*. This allows the movable member 23*b* to be displaced in its axial direction (up and down direction in the figure) as it rotates about its axis.

The meshing (holding portion) between the male thread 23*c* and the female thread 23*d* allows the movable member 23*b* to be held so as to be movable in the axial direction with respect to the valve frame 23*a*. A plunger 23*e* is held on the inner circumferential side of the movable member 23*b*, so as to also be movable in the axial direction. The axis of the valve frame 23*a*, the axis of the movable member 23*b*, and the axis of the plunger 23*e* are aligned. Hereinafter, each of these axes is referred to as a plunger axis J. The plunger 23*e* is movably held along the plunger axis J. The plunger 23*e* is held so as to be movable between a closed position, where the accumulation chamber 20 is sealed, and an open position, where the accumulation chamber 20 is opened.

The above movable member 23*b* is held so as to be movable along the plunger axis J between a normal position and an operation position. A compression spring 23*f* is interposed between the movable member 23*b* and the plunger 23*e*. A tip end of the plunger 23*e* is inserted into a vent hole 23*g* of the valve frame 23*a*. The plunger 23*e* is inserted into the vent hole 23*g* and is movably supported in the plunger axis J direction. The plunger 23*e* is biased toward the closed position side (downward in the figure) via the compression spring 23*f* The plunger 23*e* is held in a lower, closed position due to the biasing force of the compression spring 23*f*. The plunger 23*e* is displaced in the upper, open position when it moves against the biasing force of the compression spring 23*f*.

A seal ring 23*h* is interposed between the tip end of the plunger 23*e* and the vent hole 23*g*. The vent hole 23*g* is hermetically sealed by the seal ring 23*h*. A slit 23*i*, which may be used for ventilation, is formed at the tip end of the plunger 23*e*. The slit 23*i* extends in a certain area along the plunger axis J. Each slit 23*i* is arranged at two opposing locations around the plunger axis J.

The plunger 23*e* moves in the plunger axis J direction such that the gas pressure in the accumulation chamber 20 and the biasing force of the compression spring 23*f* are balanced. When the gas pressure in the accumulation chamber 20, which may exert a force on the plunger 23*e*, is smaller than the biasing force of the compression spring 23*f*, the plunger 23*e* is held in the lower, closed position. When the plunger 23*e* is held in the lower closed position, a portion at a base of the plunger 12*e*, a portion without the slits 23*i*, is located on the inner circumferential side of the seal ring 23*h*. In this state, the vent hole 23*g* is hermetically sealed. Accordingly, the accumulation chamber 20 is hermetically sealed with respect to the outside, such that the pressure in the accumulation chamber 20 is maintained at a constant level (and/or below a preset pressure).

When the gas pressure within the accumulation chamber 20, which may exert a force on the plunger 23*e*, becomes greater than the biasing force of the compression spring 23*f*, the plunger 23*e* is displaced to the upper, open position, as is moves against the biasing force of the compression spring 23*f*. As the plunger 23*e* is displaced at the upper, open position, the slits 23*i* become located on the inner circumferential side of the seal ring 23*h*. In this state, the airtightness of the vent hole 23*g* is released.

An opening hole 23*j* is provided at an upper part of the movable member 23*b*. The opening hole 23*j* allows the inner circumferential side and the outer circumferential side of the movable member 23*b* to be in communication. Therefore, if the airtightness of the vent hole 23*g* is released, for instance after the plunger 23*e* is displaced to the upper, open position, the accumulation chamber 20 is opened to the outside (to the atmospheric side) via the inner circumferential side of the valve frame 23*a*, the inner circumferential side of the movable member 23*b*, and the opening hole 23*j*. The compressed gas within the accumulation chamber 20 is therefore released to the outside. When the gas pressure within the accumulation chamber 20 becomes lower than the preset pressure, the plunger 23*e* is returned to the closed position due to the biasing force of the compression spring 23*f* such that the accumulation chamber 20 is hermetically sealed.

The biasing force of the compression spring 23*f*, corresponding to an embodiment of the preset pressure of the accumulation chamber 20, may be varied by moving the movable member 23*b*. When the movable member 23*b* is displaced downward, the biasing force of the compression spring 23*f* is increased. When the movable member 23*b* is displaced upward, the biasing force of the compression spring 23*f* is reduced. Therefore, when the movable member 23*b* is displaced downward, the preset pressure of the accumulation chamber 20 may be increased. Accordingly, the gas pressure within the accumulation chamber 20 may be increased (e.g., set to a higher pressure).

When the movable member 23*b* is displaced upward, the preset pressure of the accumulation chamber 20 will be reduced. The lower gas pressure allows the plunger 23*e* to move to the open position side. When the movable member 23*b* is sufficiently displaced upward, the biasing force of the compression spring 23*f* will not act on the plunger 23*e*. In this state, the accumulation chamber 20 is opened to the atmosphere, thereby allowing substantially all the compressed gas in the accumulation chamber 20 to be released through the vent hole 23*g*, the inner circumference side of the valve frame 23*a*, the inner circumference side of the movable member 23*b*, and the open hole 23*j*.

Since the accumulation chamber 20 is opened to the atmosphere, the gas pressure applying a force on the impact piston 13 can be eliminated. This enables for a quick and easy removal of nails stuck in the driving nose 18. An upper position of the movable member 23*b*, which allows for opening the accumulation chamber 20 to the atmosphere, corresponds to an embodiment of an operation position. A lower position of the movable member 23*b*, which allows for setting the gas pressure within the accumulation chamber 20 at a preset pressure, corresponds to an embodiment of a normal position.

Accordingly, the relief valve 23 serves to hold the movable member 23*b* at the normal position and to maintain the accumulation chamber 20 at the preset pressure. In addition, the relief valve 23 also serves as the opening valve 24 to allow the accumulation chamber 20 to open to the atmosphere, for instance by displacing the movable member 23*b* to the operation position.

A tool engagement portion 23*k* is configured to allow a tool 26 to engage. The tool engagement portion 23*k* is provided at an upper part of the movable member 23*b*. In the present embodiment, a hexagonal wrench (e.g., an Allen wrench) may be used as the tool 26. Therefore, a hexagonal hole is formed as the tool engagement portion 23*k* in the present embodiment. The tool engagement portion 23*k* penetrates from an upper side of the movable member 23*b* to the inner circumferential side. As shown in FIG. 6, the movable member 23*b* is rotated so as to be displaced up and down by allowing the tool 26 to engage the tool engagement portion 23*k*. This allows the movable member 23*b* to quickly and precisely displace between a normal position and an operation position.

According to the first embodiment of the driving tool 1 as described above, an accumulation chamber 20 includes a charge valve 22, a relief valve 23, and an opening valve 24. The opening valve 24 opens the accumulation chamber 20 to the atmosphere, such that a countermeasure to jamming can be quickly and easily taken. After opening the accumulation chamber 20, a compressed gas can be quickly charged into the accumulation chamber 20 from an external device 2 using a connection port 22*f* of the charge valve 22. As a result, the driving tool 1 can be quickly restarted to continue a driving operation, as compared with a conventional structure in which the charging is performed by the internal operation of the tool body.

The charge valve 22 is arranged in a valve recess 25. The valve recess 25 may be formed in the upper housing 21 of the accumulation chamber 20. This avoids the charge valve 22 projecting from the tool housing 11 or from the outer shell of the upper housing 21. Therefore, other components interfering with the charge valve 22 can be avoided, thereby avoiding damage thereto.

In the first embodiment, the opening valve 24 is integrated with the relief valve 23, such that a single valve is allowed to have the function of the both valves. This enhances flexibility in the placement of the relief valve 23 and the opening valve 24, and achieves downsizing of the tool body part 10.

The plunger 23*e* is configured to move in the relief valve 23 to the open position and against the biasing force of the compression spring 23*f* so as to release the pressure of the compressed gas within the accumulation chamber 20. As a result, the accumulation chamber 20 is maintained at a preset pressure. The preset pressure within the accumulation chamber 20 can be adjusted by varying the biasing force of the compression spring 23*f*. For instance, the biasing force of the compression spring 23*f* may be varied by displacing the movable member 23*b*.

The biasing force of the compression spring 23*f* may act on the plunger 23*e* when the movable member 23*b* is in the normal position. A range where the biasing force of the compression spring 23*f* acts on the plunger 23*e* corresponds to an embodiment of the normal position of the movable member 23*b*. The preset pressure within the accumulation chamber 20 may be adjusted by varying the normal position of the movable member 23*b*.

When the movable member 23*b* is moved to the operation position, the biasing force of the compression spring 23*f* does not substantially act on the plunger 23*e*. This allows the accumulation chamber 20 to open to the atmosphere to release substantially the entirety of the compressed gas. The accumulation chamber 20 is opened to the atmosphere such that the gas pressure of the compressed gas does not substantially act on the impact piston 13. Therefore, it is possible to take a countermeasure to quickly and easily act on the driving nose 18 to remove a jam. The movement operation of the movable member 23*b* between the normal position and the operation position can be done quickly and precisely by using the tool 26 to engage the tool engagement portion 23*k*.

The relief valve 23 and the opening valve 24 are incorporated in a valve frame 23*a*, which may be provided at the upper housing 21. The valve frame 23*a* is provided so as to project into the accumulation chamber 20. The relief valve 23 and the opening valve 24 are thus arranged so as not to project from the outer shell of the upper housing 21. Therefore, the valve frame 23*a* is formed as an embodiment of a second valve recess. Interference of other components with the relief valve 23 and the opening valve 24 can be avoided, thereby avoiding damage thereto.

In the first embodiment, the charge valve 22, the relief valve 23, and the opening valve 24 are all disposed above the cylinder 12. This simplifies the structure around the cylinder 12. Therefore, the driving tool 1 can be slimmed down.

Further, according to the illustrated driving tool 1, the pressure within the accumulation chamber 20 is increased by moving the impact piston 13 upward toward the top dead center by the driving mechanism, which may have an electric motor 17. Thus, the upward movement of the impact piston 13 is used to ensure the pressure necessary for the driving action. This avoids the need for an additional specific means to enhance the pressure within the accumulation chamber 20.

Various modifications may be made to the above-describe first embodiment. For example, instead of using a hexagon wrench as the tool 26, it is also possible to use a structure configured to displace the movable member 23*b* using a manual driver. In this case, instead of a hexagonal hole as the tool engagement portion 23*k*, a minus-shaped or plus-shaped groove may be provided, for example.

Further, although not shown, instead of the tool engagement portion 23*k*, it is also possible to have a structure configured to provide a knob or a lever such that the movable member can be operated without using a tool 26, such as the hexagon wrench.

Figure 7:
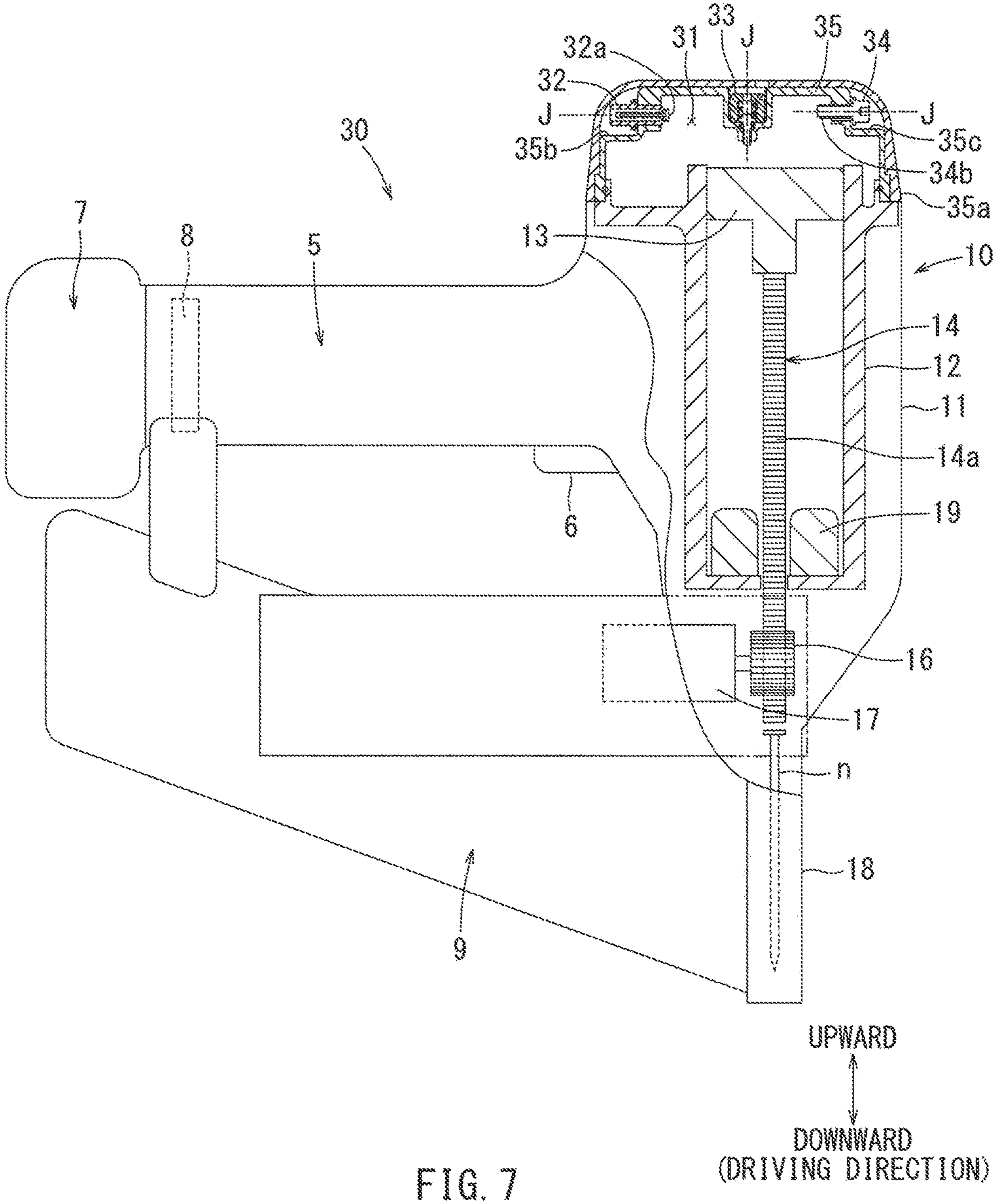
FIG. 7 is a vertical cross-sectional view of a driving tool according to a second embodiment.

In FIG. 7, a driving tool 30 according to a second embodiment is shown. In the second embodiment, a charge valve 32, a relief valve 33, and an opening valve 34, which are provided at an accumulation chamber 31, are different from those of the first embodiment. For components and configurations that do not require substantial modification, the same reference numerals will be used and the description thereof will be omitted.

The charge valve 32, the relief valve 33 and the opening valve 34 are disposed at an upper housing 35, which in this embodiment defines a top part of the tool housing 11. Similar to the first embodiment, an outer surface of the upper housing 35 is covered with an elastic rubber layer 35*a* for shock adsorption.

The charge valve 32 has substantially the same structure as the charge valve 22 according to the first embodiment. However, an orientation of the arrangement of the second embodiment is different from that of the first embodiment. In the second embodiment, the charge valve 32 is arranged laterally, such that the plunger axis J intersects (is orthogonal to) a reciprocal movement direction of the impact piston 13. Therefore, the plunger 32*a* of the charge valve 32 may be displaced in a direction orthogonal to the driving direction.

Figure 8:
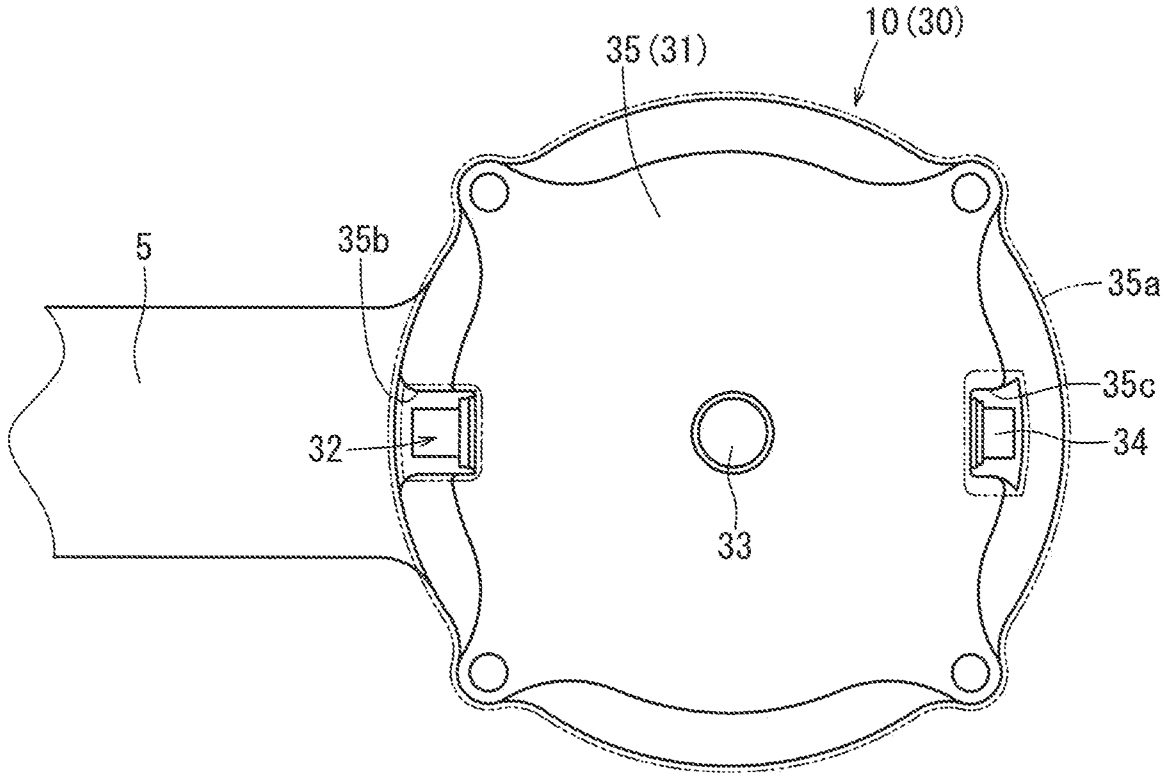
FIG. 8 is a top view of an accumulation chamber according to the second embodiment.

As shown in FIGS. 7 and 8, the charge valve 32 is arranged in a valve recess 35*b* formed in the upper housing 35. Therefore, the charge valve 32 is arranged so as not to project from the outer shell of the upper housing 35. This avoids other components interfering with the charge valve 32, thereby preventing damage thereto, similar to the first embodiment. The external device 2 is connected to the charge valve 32 to allow the compressed gas to be quickly charged into the accumulation chamber 31.

In the second embodiment, the relief valve 33 and the opening valve 34 are arranged apart from each other. This is different form the first embodiment, in which the relief valve 23 is integrated with the opening valve 24 so as to serve as a relief/opening combination valve. In the second embodiment, the relief valve 33 is arranged substantially in the center of the upper housing 35. The relief valve 33 is vertically arranged, such that its plunger axis J is parallel to the driving direction, similar to the first embodiment.

The relief valve 33 of the second embodiment has substantially the same structure as the relief valve 23 of the first embodiment. The relief valve 33 of the second embodiment includes a valve frame 23*a*, a movable member 23*b*, and a plunger 23*e*. The plunger 23*e* is biased toward the closed position side by a compression spring 23*f* interposed between the plunger 23*e* and the movable member 23*b*. The movable member 23*b* is screw-fitted to an inner circumferential side of the valve frame 23*a*.

The changing the position of the movable member 23*b* changes the biasing force of the compression spring 23*f*, thereby adjusting the preset pressure within the accumulation chamber 31. When the gas pressure within the accumulation chamber 31 becomes greater than the biasing force of the compression spring 23*f*, the plunger 23*e* displaces to the open position side and against the force of the compression spring 23*f* As a result, the compressed gas is released via the opening hole 23*j* of the movable member 23*b*, thereby maintaining the accumulation chamber 31 at a preset pressure.

The tool engagement portion 23*k* of the first embodiment, which is operated when opening the accumulation chamber 31 to the air is omitted in the relief valve 33 according to the second embodiment. Therefore, the relief valve 33 according to the second embodiment is always covered by the elastic rubber layer 35*a* and does not project from the outer shell of the upper housing 35. The relief valve 33 according to the second embodiment is not configured to be operated to open the accumulation chamber 31 to the atmosphere. In the relief valve 33 according to the second embodiment, the movable member 23*b* is operated only to change the preset pressure within the accumulation chamber 31.

In the second embodiment, an opening valve 34 is used to open the accumulation chamber 31 to the atmosphere. The opening valve 34 is arranged within a second valve recess 35*c* provided at the side of the upper housing 35. The opening valve 34 includes a head 34*a*, which may have a hexagonal hole 34*c*, and a screw shaft 34*b*. A seal member 34*d* is attached to a lower side of the head 34*a*.

The screw shaft 34*b* of the opening valve 34 is screwed into a screw hole 35*d*, which may be formed in a vertical wall 35*f* of the second valve recess 35*c*. A hexagon wrench (not shown) is allowed to engage into the hexagonal hole 34*c* of the head 34*a* in order to rotate the opening valve 34. Rotating the opening valve 34 causes a change in the tightening position of the screw shaft 34*b* with respect to the screw hole 35*d*. As a result, the opening valve 34 displaces in its axial direction (corresponding to the plunger axis J).

Open grooves 35*e* are provided in the screw hole 35*d* along its axial direction. The open grooves 35*e* extend from the accumulation chamber 31 side to the vertical wall 35*f* and passes through the upper housing 35 in the thickness direction. When the opening valve 34 is operated to rotate toward the normal position side, the opening valve 34 is shifted to the left side in FIG. 9, such that the screw shaft 34*b* is tightened more deeply into the screw hole 35*d*. When the opening valve 34 is operated to rotate to the normal position, the open grooves 35*e* are hermetically sealed by the seal member 34*d*. As a result, the accumulation chamber 31 is hermetically sealed.

Figure 9:
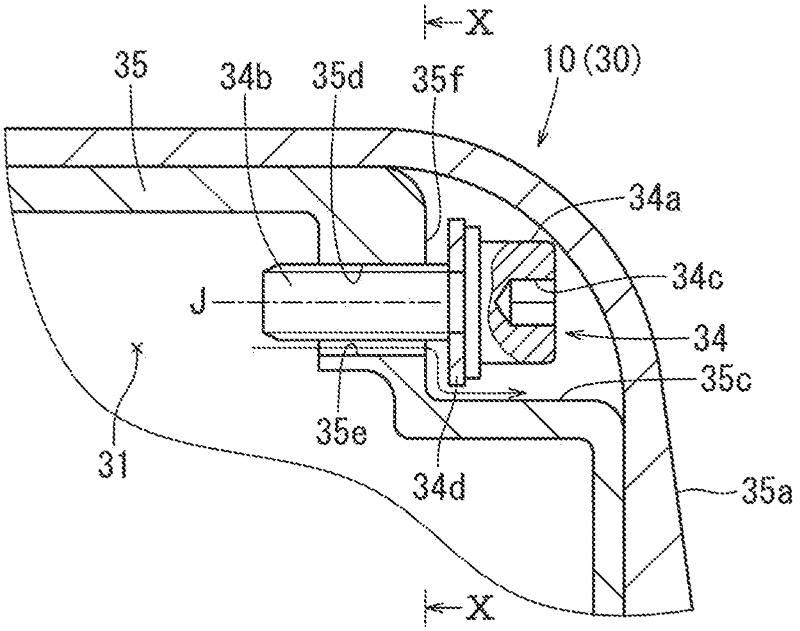
FIG. 9 is a vertical cross-sectional view of an opening valve according to the second embodiment.
Figure 10:
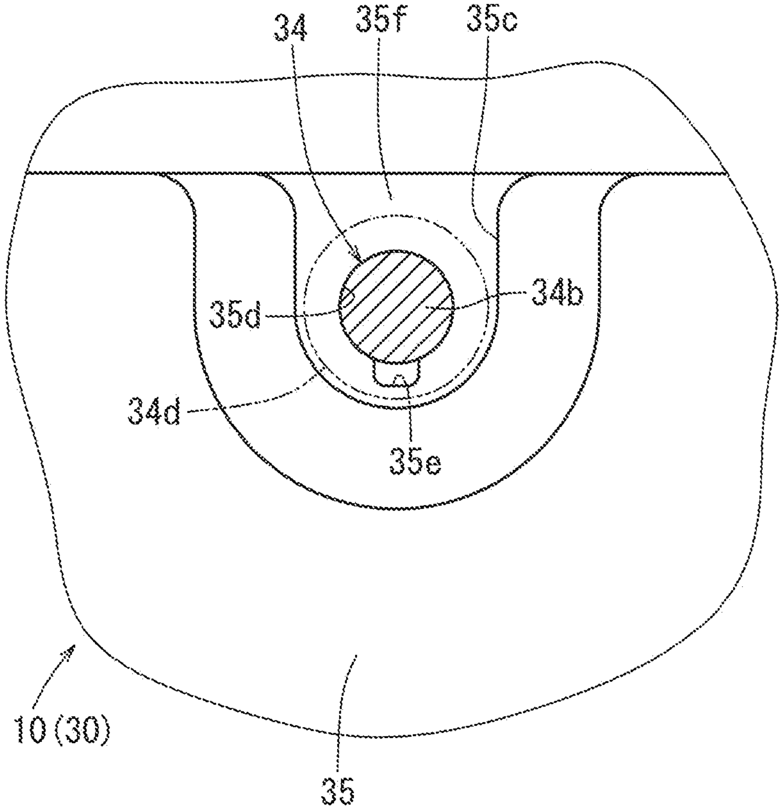
FIG. 10 is a lateral cross-sectional view of the opening valve according to the second embodiment.

When the opening valve 34 is operated to rotate toward the operation position side, the opening valve 34 is shifted to the right as shown in FIG. 9, such that the screw shaft 34*b* is loosened from the screw hole 35*d* and becomes more shallow. This allows the seal member 34*d* to separate from the open grooves 35*e*, so as to open the accumulation chamber 31 to the atmosphere. By opening the accumulation chamber 31 to the atmosphere, the removal operation of a nail from the driving nose 18 can be performed quickly.

As described-above, the driving tool 30 according to the second embodiment also includes the charge valve 32, the relief valve 33, and the opening valve 34 in the accumulation chamber 31. The external device 2 can be connected to the charge valve 32 so that the compressed air can be quickly charged into the accumulation chamber 31. The accumulation chamber 31 can be maintained at a preset pressure by the relief valve 33. The opening valve 34 serves to open the accumulation chamber 31 to the atmosphere 31 such that a removal operation of a nail can be quickly and easily performed.

In the second embodiment, the charge valve 32, the relief valve 33 and the opening valve 34 are arranged independent of each other. Therefore, good operability of each of the valves 32, 33, 34 can be ensured. Further, flexibility in the placement of each of the valves 32, 33, 34 is enhanced.

According to the second embodiment, the charge valve 32 and the opening valve 34 are laterally arranged. Therefore, the plunger axis J of the charge valve 32 and the opening valve 34 intersects the moving direction of the impact piston 13. Thus, in the second embodiment, the flexibility in the placement orientation of the charge valve 32, the relief valve 33, and the opening valve 34 (and accordingly the orientation of their plunger axes J) is enhanced.

Also, in the second embodiment, the charge valve 32, the relief valve 33, and the opening valve 34 are all disposed above the cylinder 12. Therefore, the structure around the cylinder 12 is simplified such that the driving tool 30 can be slimmed down.

Also, in the second embodiment, the charge valve 32, the relief valve 33, and the opening valve 34 are arranged so as not to project from the outer shell of the upper housing 35. This avoids interference of other components with each of the valves 32, 33, 34 and prevents damage thereto.

Further, similar to the first embodiment, in the second embodiment, the pressure within the accumulation chamber 20 is increased by moving the impact piston 13 toward the top dead center by the driving mechanism having the electric motor 17. In this way, the pressure necessary for the driving action is ensured by utilizing the upward motion of the impact piston. Therefore, there is no need for any additional specific means to enhance the pressure within the accumulation chamber 20.

Further modifications may be made to the above-described first and second embodiments. For example, for the relief valves 23, 33, the upper housings 21, 35 are configured to have a concave shape, so as to serve as a valve frame 23*a*. Alternatively, the relief valves 23, 33 may be assembled using a dedicated valve frame 22*a*, as with the charge valves 22, 32.

Further, for the driving mechanism configured to move the impact piston 13 upward toward the top dead center, a press-roller type or a winding type of mechanism may be adopted, instead of the rack and pinion type mechanism.

Further, although a driving tool 1 using nails as fasteners n has been illustrated, the illustrated valve structure may be adopted to other devices, such as a tacker using staples as fasteners.

Figure 11:
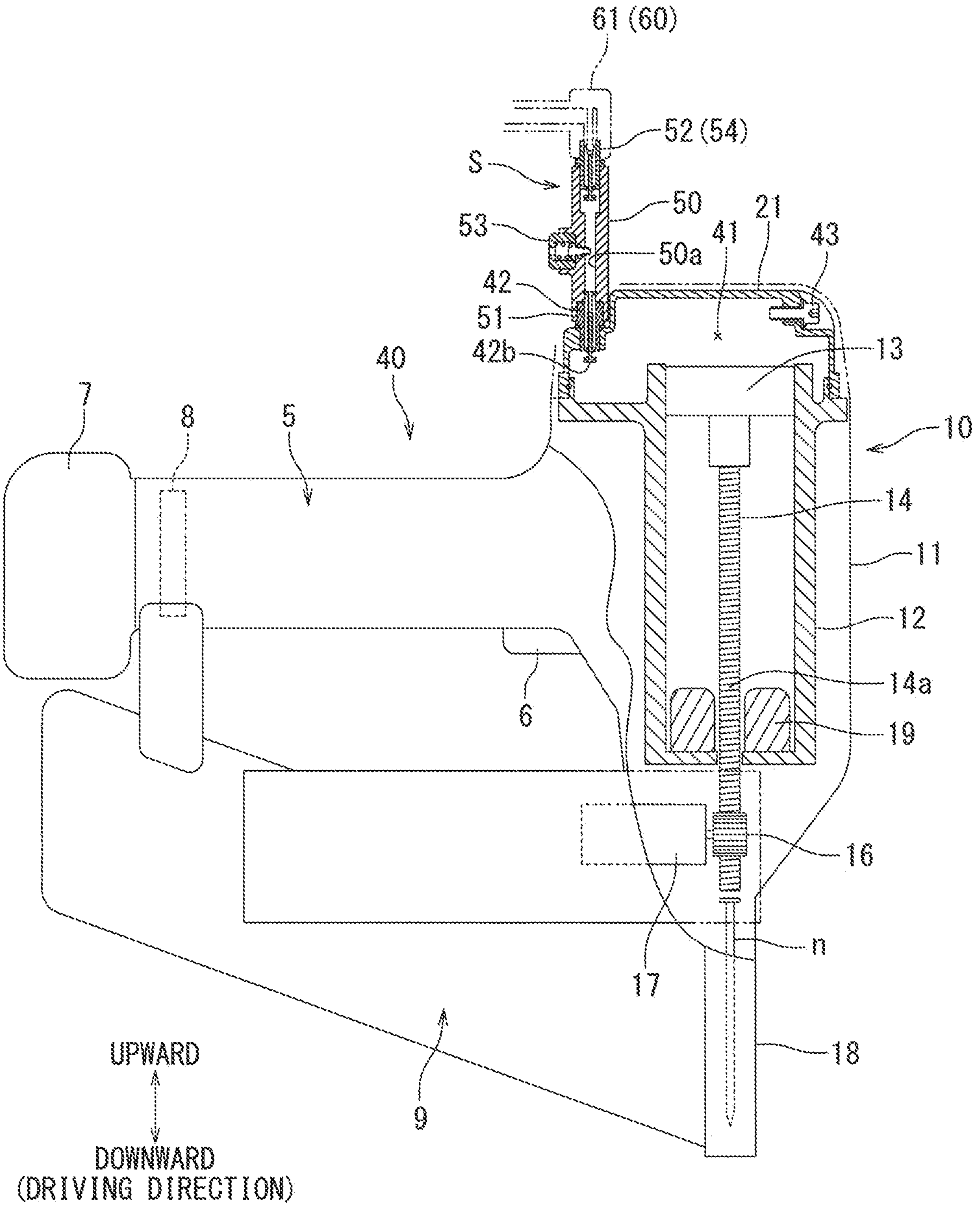
FIG. 11 is a vertical cross-sectional view of the driving tool according to a third embodiment.
Figure 12:
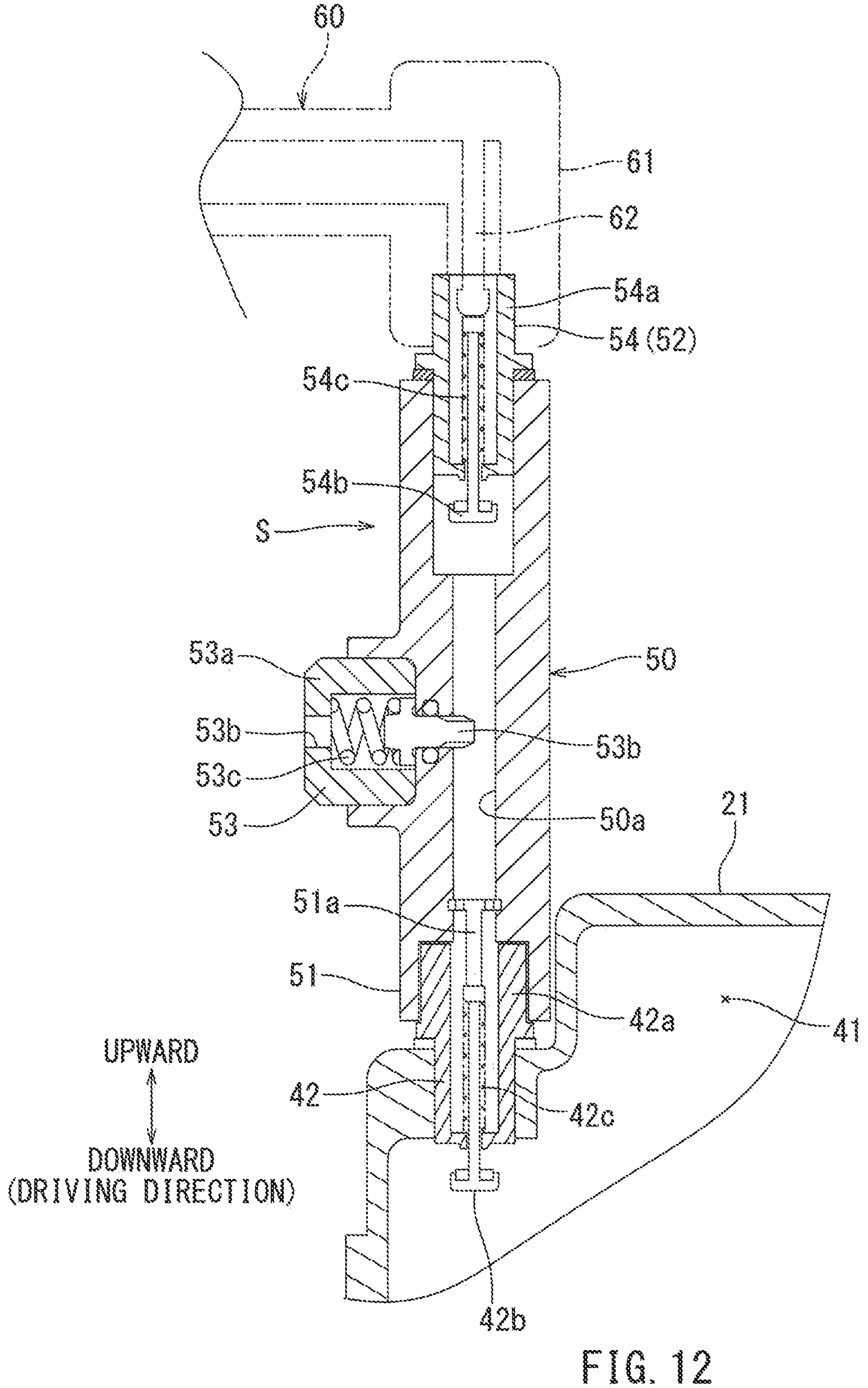
FIG. 12 is a vertical cross-sectional view in a state where an adaptor is attached to the charge valve.
Figure 13:
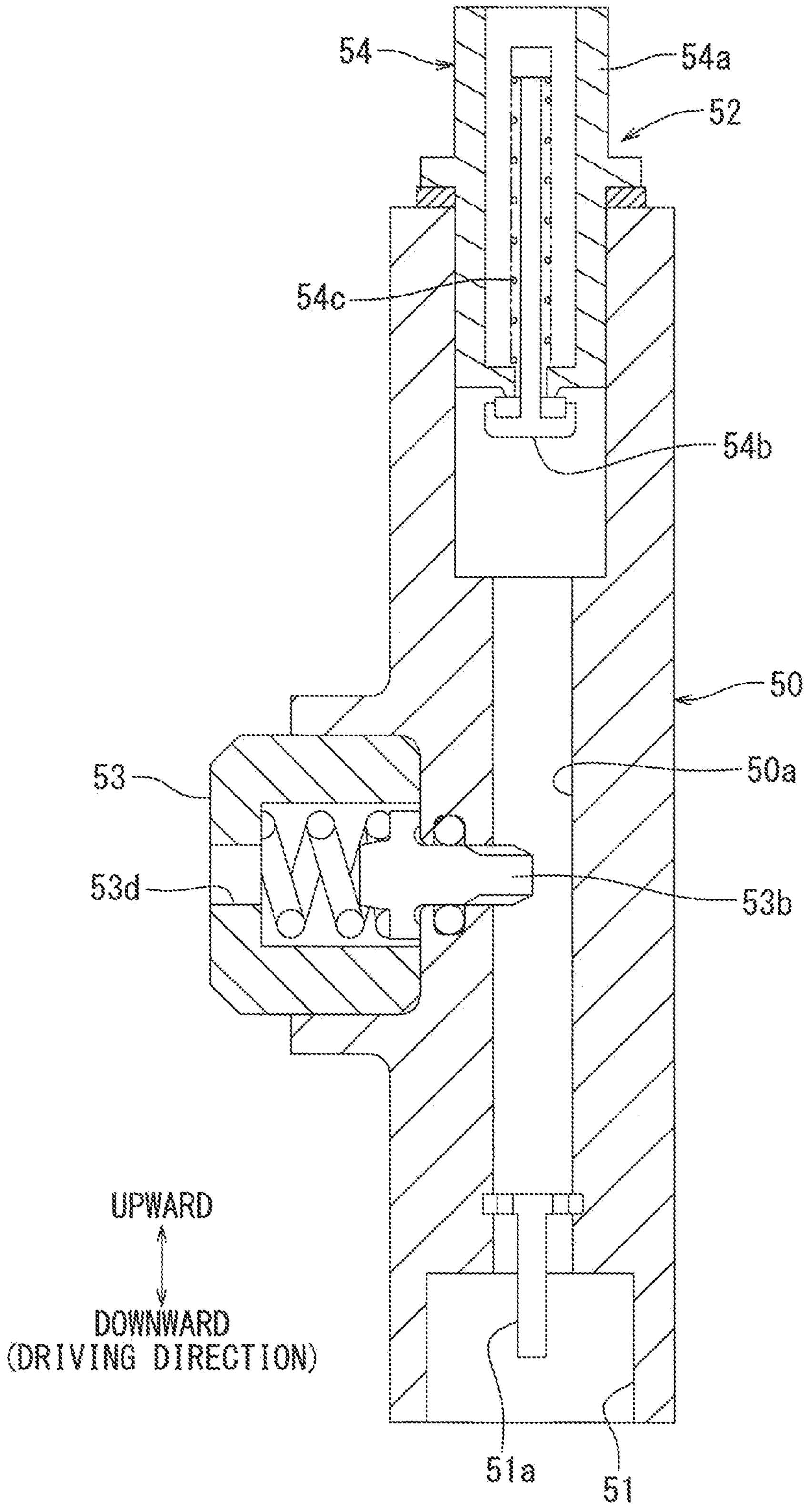
FIG. 13 is a vertical cross-sectional view of the adaptor.

A third embodiment is illustrated in FIGS. 11 to 13. In the third embodiment, a driving tool system S is illustrated, in which the compressed gas is charged to the driving tool 40 using an adaptor 50. The compressed gas, which can be used as a power source, is supplied to the driving tool 40 by the driving tool system S. A gas-spring type driving tool is illustrated as a driving tool 40 which drives fasteners n one by one, similar to the first and second embodiments. The driving tool 40 includes a tool main body 10 to accommodate an impact mechanism and a driving mechanism, a handle 5, a magazine 9, and a driving nose 18, similar to the first and second embodiments. The same reference numerals will be used for other components and structures similar to the first and second embodiments and the description thereof will be omitted.

The upper housing 21 is hermetically coupled to the top part of the tool housing 11. An interior of the upper housing 21 and the top part of the impact piston 13 serve as portions of the accumulation chamber 41. The charge valve 42 and the opening valve 43 are provided in the accumulation chamber 41. The charge valve 42 includes a cylindrical valve frame 42*a*, similar to that of the first and second embodiments, and a plunger 42*b* displaceably supported by the valve frame 42*a*. The plunger 42*b* is biased toward the closing side by the compression spring 42*c*. The opening/closing valve 43 includes substantially the same configuration as that of the opening/closing valve 34 of the second embodiment. The accumulation chamber 41 is opened to the atmosphere by loosening the opening valve 43. As a result, a removal operation of a nail from the driving nose 18 can be performed quickly.

An adapter 50 is attached to the charge valve 42 to charge compressed gas into the accumulation chamber 41. The inner circumferential side of the adaptor 50 has a vertically long and substantially cylindrical shape, which serves as an air flow channel 50*a*. A first connection port 51 is provided at a lower part of the adaptor 50 and is dedicated for connection to the charging adaptor 42. A versatile second connection port 52 is provided at an upper part of the adaptor 50 and has a connection form which is defined by standards. An opening pin 51*a* is provided in the first connection port 51. The opening pin 51*a* pushes the plunger 42*b* downward against the compression spring 42*c* when the first connection port 51 is set to the charge valve 42 while grasping the adaptor 50. As a result, the charge valve 42 opens such that the air flow channel 50*a* of the adaptor 50 communicates with the accumulation chamber 41.

An opening/closing valve 54 is non-removably attached to the second connection port 52. The opening/closing valve 54 includes a cylindrical frame 54*a*, and one plunger 54*b* supported by the frame 54*a*. The plunger 54*b* is biased toward the closing side via the compression spring 54*c*. A nozzle 61 of an external compressed gas supplying device 60 is connected to the second connection port 52. An opening pin 62 is provided on an inner circumferential side of the nozzle 61. When the nozzle 61 is connected to the second connection port 52, the opening pin 62 pushes the plunger 54*b* downward against the compression spring 54*c*. As a result, the second connection port 52 opens such that compressed gas can flow from the compressed gas supplying device 60 to the air flow channel 50*a*.

A relief valve 53 is provided at the adaptor 50. The relief valve 53 is provided in the middle of the air flow channel 50*a*. The relief valve 53 is configured to support one plunger 53*b* by a valve frame 53*a*. The plunger 53*b* is biased toward the closing side with a compression spring 53*c*. The relief valve 53 has a similar configuration to the relief valve 33 of the second embodiment. When the gas pressure within the air flow channel 50*a* raises over a certain value, the plunger 53*b* displaces toward the opening side and against the force of the compression spring 53*c* due to the gas pressure. When the plunger 53*b* is displaced to the opening side, the air flow channel 50*a* is opened to the atmosphere via the opening hole 53*d* provided in the valve frame 53*a*. As a result, the gas pressure within the accumulation chamber 41 is maintained at a preset pressure.

According to a driving tool system S of the third embodiment, the adaptor 50 can be used when charging compressed gas into the accumulation chamber 41. An excessive supply of the compressed gas to the accumulation chamber 41 is avoided by the relief valve 53 provided at the adaptor 50. This allows the gas pressure within the accumulation chamber 41 to be maintained at a preset pressure. The adaptor 50 is removed from the charge valve 42 at a stage where the charging of the compressed gas into the accumulation chamber 41 is completed, or at a stage where the charging is not performed. Therefore, the relief valve 53 is removed together with the adaptor 50. The relief valve 53 is thus protected from the oscillation or impact generated by driving the gas driving device (driving tool 40). As described above, according to the illustrated driving tool system S, the durability of the relief valve 53 can be enhanced as the relief valve 53 is attached to the driving tool 40 only when necessary (e.g., when charging the gas), and is removed when the driving tool 40 is operating.

According to the third embodiment, the second connection port 52 of the adaptor 50 has a versatile connection form that is defined by standards, and the first connection port 41 has a connection form dedicated to the driving tool system S of the present case. Therefore, a valve that is not compatible to the charge valve 42 (for example, an opening size for connection is different) can be used for the opening/closing valve 54 of the adaptor 50. Since the compressed gas supplying device 60 cannot be directly connected to the charge valve 42, the adaptor 50 must be used for the charging operation of the compressed gas into the accumulation chamber 41.

According to the above-described driving tool 40 and driving tool system S of the third embodiment, the charging operation of the compressed gas to the accumulation chamber 41 can be quickly performed using an adaptor 50 having a relief valve 53. Further, the accumulation chamber 41 is maintained at a preset pressure due to the relief valve 53. The opening valve 43 can open the accumulation chamber 41 to the atmosphere such that a nail can be quickly and easily removed.

Further, according to the third embodiment, when the charging operation of the compressed gas into the accumulation chamber 41 is not being performed (for example, during a driving operation), the adaptor 50 can be removed. This ensures the relief valve 53 is protected against an impact, etc. during driving. Therefore, the durability of the relief valve 53 can be enhanced.

Further, according to the third embodiment, the opening/closing valve 54 of the second connection port 52 is not compatible with the charge valve 42, since the connection form, such as an opening size, etc., is different. Therefore, the external compressed gas supplying device 60 may not be allowed to directly connect to the charge valve 42. For this reason, it may be necessary to use an adaptor 50 having a relief valve 53 during the charging operation of the compressed gas into the accumulation chamber 41. A charging operation is thus performed only under the circumstance where excessive supply of the compressed gas can be avoided by a relief valve 53. This avoids excessive supply of the compressed gas into the accumulation chamber.

The driving tool 1 in the embodiments is one example of a driving tool in one aspect of the present disclosure. The impact piston 13 in the embodiments is one example of the impact piston in one aspect of the present disclosure. The electric motor 17 in the embodiments is one example of an electric motor in one aspect of the present disclosure. The accumulation chamber 20 in the embodiments is one example of an accumulation chamber in one aspect of the present disclosure. The charge valves 22, 32 in the embodiments are one example of a charge valve in one aspect of the present disclosure. The relief valves 23, 33 in the embodiments are one example of a relief valve in one aspect of the present disclosure. The opening valves 24, 34 in the embodiments are one example of an opening valve in one aspect of the present disclosure.

The external device 2 in the embodiments is one example of an external device in one aspect of the present disclosure. The connection port 22*f* in the embodiments is one example of a connection port in one aspect of the present disclosure. The cylinder 12 in the embodiments is one example of a cylinder in one aspect of the present disclosure. The tool housing 11 in the embodiments is one example of a tool housing in one aspect of the present disclosure. The valve recesses 25, 35*b* in the embodiments are one example of a valve recess in one aspect of the present disclosure.

The plunger 23*e* in the embodiments is one example of a plunger in one aspect of the present disclosure. The movable member 23*b* in the embodiments is one example of a movable member in one aspect of the present disclosure. The compression spring 23*f* in the embodiments is one example of an elastic member in one aspect of the present disclosure. The tool engagement portion 23*k* in the embodiments is one example of a tool engagement portion in one aspect of the present disclosure. The second valve recess 35*c* in the embodiments is one example of a second valve recess in one aspect of the present disclosure. The plunger 32*a* in the embodiments is one example of a plunger in one aspect of the present disclosure.

The driving tool system S in the embodiments is one example of a driving tool system in one aspect of the present disclosure. The driving tool 40 in the embodiments is one example of a driving tool in one aspect of the present disclosure. The adaptor 50 in the embodiments is one example of an adaptor in one aspect of the present disclosure. The relief valve 53 in the embodiments is one example of a relief valve in one aspect of the present disclosure. The first connection port 51 in the embodiments is one example of a first connection port in one aspect of the present disclosure. The second connection port 52 in the embodiments is one example of a second connection port in one aspect of the present disclosure. The external compressed gas supplying device 60 in the embodiments is one example of an external compressed gas supplying device in one aspect of the present disclosure.

The invention claimed is:

1. A driving tool, comprising:

an impact piston configured to move downward within a cylinder to strike a fastener;

a driving mechanism configured to move the impact piston upward toward a top dead center using an electric motor as a power source, the upward movement of the impact piston being configured to compress gas to obtain a thrust force to serve as a power source to move the impact piston downward to drive;

an accumulation chamber for accumulating the compressed gas;

a charge valve configured to charge and compress gas into the accumulation chamber, the charge valve having a connection port configured to be connected to an external device to allow compressed gas supplied from the external device to be filled in the accumulation chamber;

a relief valve configured to maintain the compressed gas in the accumulation chamber at a preset pressure by releasing the compressed gas from the accumulation chamber; and an opening valve configured to reduce the pressure within the accumulation chamber to atmospheric pressure, wherein the relief valve and the opening valve are integrated as an integrated valve that includes (i) a plunger configured to seal the accumulation chamber, (ii) a movable member configured to be displaced by an external operation, and (iii) an elastic member interposed between the movable member and the plunger, and the movable member is configured to adjust a biasing force of the elastic member by being displaced relative to the plunger to adjust the preset pressure defined by the relief valve.

2. The driving tool according to claim 1, further comprising a tool housing configured to accommodate the cylinder and the accumulation chamber, wherein a valve recess is formed at the tool housing, and the charge valve is positioned within the valve recess such that the charge valve does not project beyond an outer shell of the tool housing.

3. The driving tool according to claim 1, wherein the movable member includes a tool engagement portion to which a tool is configured to engage the movable member to move between a normal position and an operation position.

4. The driving tool according to claim 1, further comprising a tool housing configured to accommodate the cylinder and the accumulation chamber, wherein a second valve recess is formed at the tool housing, and the relief valve and the opening valve are positioned within the second recess such that the relief valve and the opening valve do not project beyond an outer shell of the tool housing.

5. The driving tool according to claim 1, wherein the charge valve, is spaced apart from the relief valve and the opening valve.

6. The driving tool according to claim 1, wherein the plunger is configured to move between a closed position and an open position along a plunger axis that intersects a moving direction of the impact piston.

7. The driving tool according to claim 1, wherein the charge valve, the relief valve, and the opening valve are all positioned above the cylinder.

8. A driving tool system, comprising:

a driving tool having an accumulation chamber; and an adaptor used for charging compressed gas into the accumulation chamber of the driving tool, wherein:

the driving tool comprises:

an impact piston configured to move downward within a cylinder communicating with the accumulation chamber to strike a fastener;

a driving mechanism configured to move the impact piston upward toward a top dead center with an electric motor, the upward movement of the impact piston being configured to compress gas within the accumulation chamber to serve as a power source to be used to move the impact piston downward to drive;

a charge valve provided within the accumulation chamber; and an opening valve provided within the accumulation chamber and configured to open the accumulation chamber to atmosphere;

the adapter includes:

a first connection port configured to be removably connected to the charge valve of the driving tool;

a second connection port configured to be removably connected to an external compressed gas supplying device; and a relief valve configured to release compressed gas from the compressed gas supplying device to the atmosphere;

an opening/closing valve, which is provided at the second connection port, includes a plunger and a compression spring;

the plunger is configured to move between (i) a closing position to close a first end of the opening/closing valve by using an elastic force of the compression spring and (ii) an opening position to open the first end by moving against the elastic force of the compression spring; and the opening/closing valve includes a second end configured to allow a pin to be inserted, the plunger being configured to be pushed to the opening position by the pin.

9. The driving tool system according to claim 8, wherein the compressed gas supplying device is not directly connectable to the charge valve.

10. The driving tool system according to claim 8, wherein the compressed gas supplying device connects to the opening/closing valve differently than the charge valve connects to the first connection port.

* * * * *